(12) United States Patent
Erlmann (10) Patent No.: US 7,922,592 B2
(45) Date of Patent: Apr. 12, 2011

(54) LONGITUDINAL DISPLACEMENT UNIT FOR DRIVESHAFTS

(75) Inventor: Nikolaus Martin Erlmann, Düsseldorf (DE)

(73) Assignee: Spicer Gelenkwellenbau GmbH, Westendhof (DE)

( * ) Notice: Subject to any disclaimer, the term of this patent is extended or adjusted under 35 U.S.C. 154(b) by 544 days.

(21) Appl. No.: 12/012,372

(22) Filed: Feb. 1, 2008

(65) Prior Publication Data

US 2008/0194343 A1 Aug. 14, 2008

(30) Foreign Application Priority Data

Feb. 9, 2007 (DE) .......................... 10 2007 007 151

(51) Int. Cl.
*F16C 3/035* (2006.01)
(52) U.S. Cl. ........................ 464/167; 464/169
(58) Field of Classification Search .......... 464/167–169; 384/49, 54, 57
See application file for complete search history.

(56) References Cited

U.S. PATENT DOCUMENTS

| | | | |
|---|---|---|---|
| 3,279,218 A | 10/1966 | Chocholek et al. | |
| 4,075,872 A * | 2/1978 | Geisthoff | 464/167 |
| 4,981,459 A | 1/1991 | Klinkenberg | |
| 6,902,487 B2 | 6/2005 | Welschof | |
| 2001/0018369 A1 | 8/2001 | Cermak et al. | |
| 2007/0021223 A1 | 1/2007 | Kossack et al. | |

FOREIGN PATENT DOCUMENTS

| | | |
|---|---|---|
| FR | 1373752 | 10/1964 |
| GB | 1372402 | 10/1974 |
| GB | 2411930 | 9/2005 |

* cited by examiner

*Primary Examiner* — Greg Binda
(74) *Attorney, Agent, or Firm* — MacMillan, Sobanski & Todd, LLC (57) ABSTRACT

A longitudinal displacement unit includes a first shaft element including an outer face having a plurality of first grooves and a second shaft element having a through-bore that receives the first shaft element. The second shaft element has a plurality of second grooves opposite the first plurality of grooves. A sleeve-shaped cage is disposed between the first shaft element and the second shaft element for guiding rolling contact members that engage the first plurality of grooves and the second plurality of grooves. The cage is provided with through-apertures that are circumferentially distributed, extend parallel to the longitudinal axis, and include longitudinal ends. Pressure springs are disposed within the through-apertures and are loaded between the longitudinal ends thereof. At least one stop is associated with one of the shaft elements, against which the pressure springs abut after having passed through a free displacement path of the cage between the two shaft elements, which free displacement path is not loaded by the pressure springs.

20 Claims, 5 Drawing Sheets

LONGITUDINAL DISPLACEMENT UNIT FOR DRIVESHAFTS

BACKGROUND OF THE INVENTION

The invention relates to a longitudinal displacement unit for driveshafts. Driveshafts with such longitudinal displacement units are used in the driveline in engineering or vehicle construction.

U.S. Pat. No. 4,981,459 discloses a longitudinal displacement unit for driveshafts with a first shaft element that includes an outer face provided with circumferentially distributed first grooves that extend parallel to a longitudinal axis. A second shaft element is provided with a through-bore that extends along the longitudinal axis and receives the first shaft element. In the through-bore, there are provided second grooves that are positioned opposite the first grooves and extend parallel to the longitudinal axis. In the through-bore, between the first shaft element and the second shaft element, there is provided a sleeve-shaped cage that guides balls that engage grooves arranged opposite one another. The groove run-out, or the end of a recess in the outer face of the first shaft element that adjoins the grooves, forms a delimiting means or a stop for the balls, which are held close to the associated end of the cage. The travel of the cage toward the first shaft element is thus delimited. If there is provided a groove run-out, this can lead to jamming. If there is provided a circumferential recess that, as described, receives balls arranged one behind the other along the longitudinal axis, the torque transmitting ability is reduced. A further disadvantage consists in that in the case of rapid movements, the balls abut the stops correspondingly violently, with damage being likely.

French Patent No. 1,373,752 discloses a longitudinal displacement unit wherein, in contrast to the above-described state of the art, no provision is made for freely setting the cage along the longitudinal axis between the first shaft element and the second shaft element. However, the cage is arranged between springs that are supported on stops in such a way that the cage is loaded toward a central position. The spring forces that are required to actually achieve the central position have to be correspondingly high, which means that smooth operational conditions are difficult.

It is an object of this invention to provide a longitudinal displacement unit that both provides smooth operational conditions within the range of the normal relative adjustment between the shaft elements along the longitudinal axis and prevents the components from being damaged toward the end positions.

SUMMARY OF THE INVENTION

This invention relates to a longitudinal displacement unit for use in a driveshaft. The longitudinal displacement unit includes a first shaft element including an outer face having a plurality of first grooves provided therein that are circumferentially distributed in the outer face. The longitudinal displacement unit also includes a second shaft element having a through-bore that receives the first shaft element. The second shaft element has a plurality of second grooves provided in the through-bore opposite the first plurality of grooves that extend parallel to the longitudinal axis and are also circumferentially distributed. A sleeve-shaped cage is disposed in the through-bore between the first shaft element and the second shaft element. The cage guides rolling contact members that engage both the first plurality of grooves and the second plurality of grooves. The cage is provided with through-apertures that are circumferentially distributed, extend parallel to the longitudinal axis, and include longitudinal ends. Pressure springs are disposed within the through-apertures and are loaded between the longitudinal ends thereof. At least one stop is associated with one of the shaft elements, against which the pressure springs abut after having passed through a free displacement path of the cage between the two shaft elements, which free displacement path is not loaded by the pressure springs.

Within the normal operating range when the two shaft elements are adjusted relative to one another, the longitudinal displacement unit operates in a low-friction way because there exists a rolling contact friction only. The pressure springs are not effective in respect of loading the cage towards a predetermined position. When the greatest possible adjustment path is in the process of being reached, the springs first come to rest against stops so that, in the course of the respective movement, either when the telescopically inserted shaft elements are extracted or when inserting same into one another, the movement of the cage is dampened and component damage is avoided. The stop or stops can be arranged in such a way that even if the balls in the first shaft element include a run-out, the rolling contact members cannot enter that region. Only when a predetermined spring travel is reached can the rolling contact members themselves come to rest against the associated stop.

According to one embodiment of the invention, it is proposed that one of the shaft elements is associated with two stops arranged along the longitudinal axis at a distance from one another. Alternatively, both shaft elements are each associated with a stop. Additionally, both shaft elements may be associated with two stops arranged along the longitudinal axis at a distance from one another.

Although only one set of pressure springs needs to be provided, it may be desirable (such as if the cage is relatively long and if there is provided a plurality of rolling contact members in the individual rows of rolling contact members) to arrange two sets of pressure springs, one behind the other, along the longitudinal axis, with the pressure springs of the two sets cooperating with different stops. To achieve an absolute end delimitation when the spring travel of the pressure springs has been used up, the stop may be dimensioned in such a way that it is abutted by the rolling contact members positioned close to the ends of the cage.

To achieve a cage adjustment path that is not loaded by the pressure springs, relative to the shaft elements when the shaft elements are provided with stops, the distance between the stops associated with a shaft element may be greater than a length of a row of rolling contact members that are associated with a pair of a first groove and a second groove along the longitudinal axis. As an alternative to the above embodiment, the cage ends close to the rolling contact members can be used to absolutely delimit the path of the cage by ensuring that the ends come to rest against a stop. After a certain spring travel has been covered, it is also proposed that at least one stop is arranged in such a way that they are abutted by rolling contact members of the cage after the pressure spring has covered a predetermined spring travel. Each pressure spring is preferably held by a guiding element arranged in one of the through-apertures. The guiding element may include a guiding pin with a head that is provided with a head face and, at its guiding pin end, an annular face, as well as a guiding sleeve that is adjustable on the guiding pin. At its guiding pin end, the guiding element may include a first end face and, facing away therefrom, a second end face, with the pressure spring being arranged on the guiding pin between the annular face and the first end face. The head face and the second end face serve to support the guiding element, including the pressure spring, at the longitudinal ends of the associated through-aperture, with at least one of the guiding elements, after having passed through the free displacement path of the cage, abutting the at least one stop. If there are provided two sets of pressure springs, the pressure springs are preferably received in through-apertures arranged one behind the other along the longitudinal axis.

According to a preferred embodiment, the guiding element may include two guiding pins having respective heads, each including a head face and, at its guiding pin end, an annular face, with the two guiding pins each being positioned in one of the two ends of the pressure spring, and wherein the head faces rest against the longitudinal ends of the apertures in an unloaded condition. Alternatively, the guiding element may include two guiding pins, each having a head face and a supporting face at the longitudinal ends, with the associated pressure spring being received between the guiding pins.

There is no need for the guiding elements and guiding pins to be guided in a special way because they are guided in the through-apertures on the one hand and between the outer face of the first shaft element and the inner face of the second shaft element on the other hand.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Referring now to the drawings, there is illustrated in FIGS. 1 to 6 a first embodiment of a longitudinal displacement unit 1 in accordance with this invention. In the illustrated embodiment, all the components of the longitudinal displacement unit 1 are centered on a longitudinal axis 2, although such is not required. The longitudinal displacement unit 1 including two shaft elements 3 and 11 that are inserted into one another. The first shaft element 3 of the longitudinal displacement unit 1 includes a first free end 5 and an outer face 6. The outer face 6 of the first shaft element 3 includes a first plurality of grooves 7 that is circumferentially distributed around the longitudinal axis 2. The first grooves 7 extend parallel to the longitudinal axis 2 and are delimited by a circular arch radius, for example.

Figure 1:
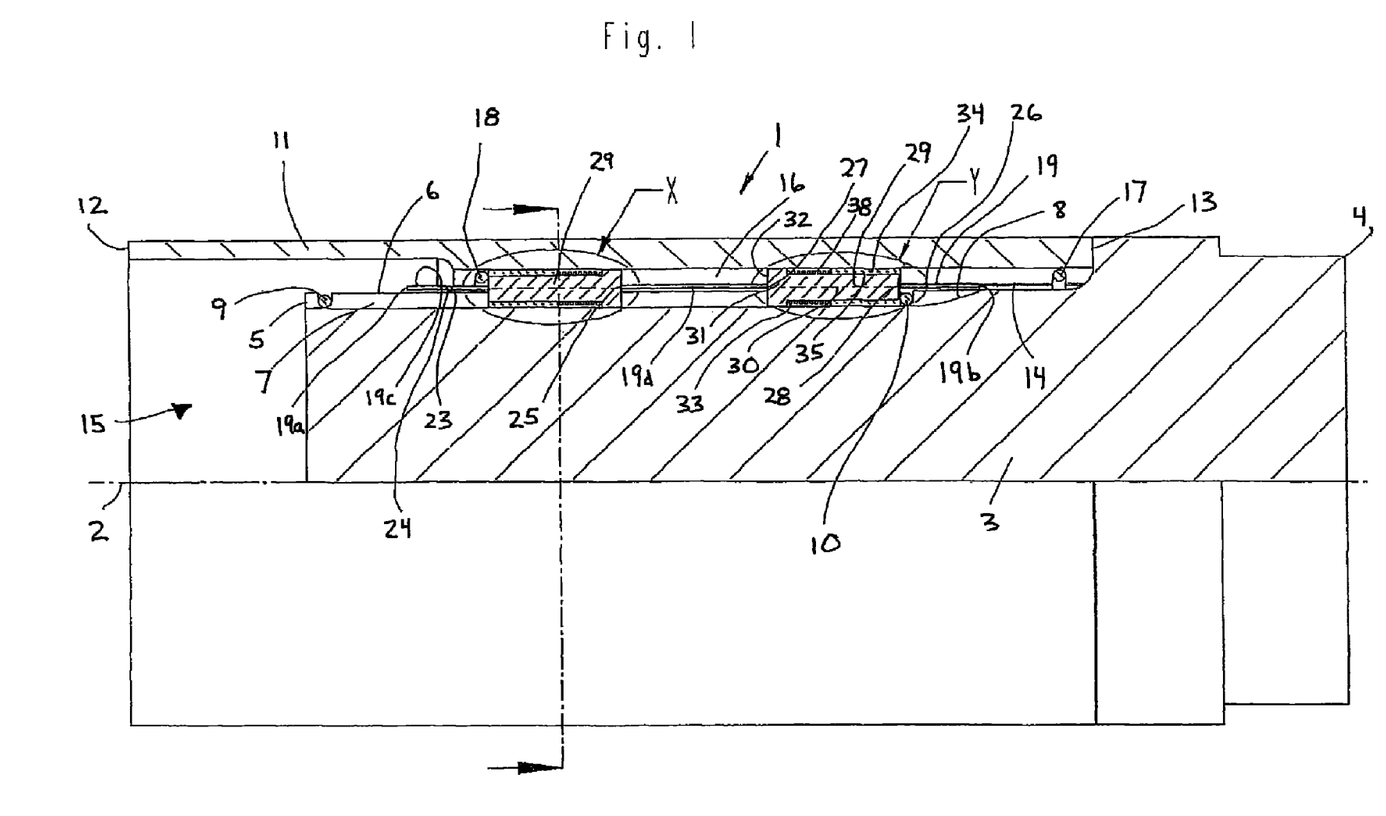
FIG. 1 is a longitudinal cross-sectional view of a first embodiment of a longitudinal displacement unit in accordance with this invention.
Figure 2:
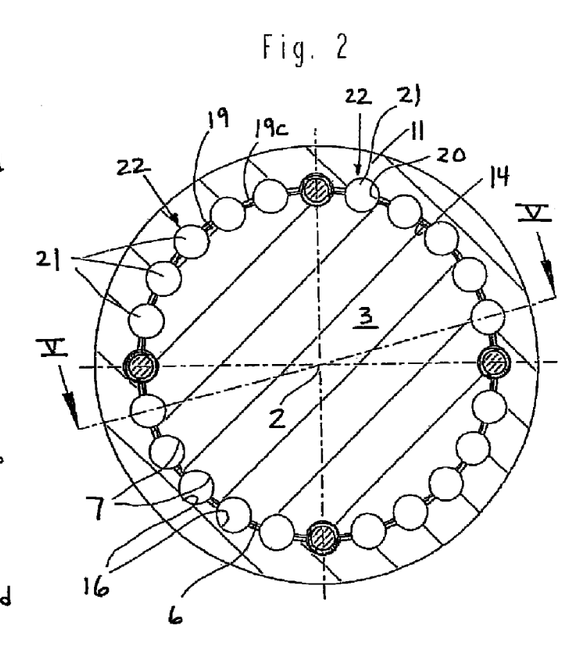
FIG. 2 is a cross-sectional view of the first embodiment of the longitudinal displacement unit taken along line II-II of FIG. 1.
Figure 3:
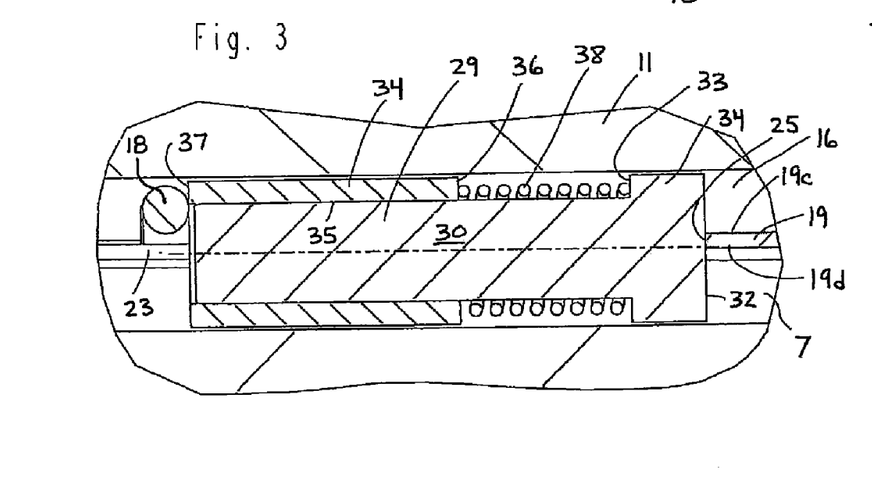
FIG. 3 is an enlarged longitudinal cross-sectional view of the detail X of FIG. 1.
Figure 4:
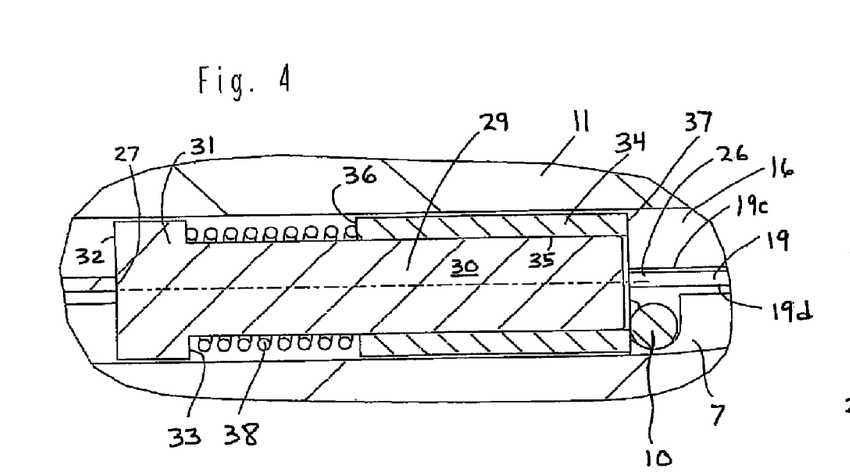
FIG. 4 is an enlarged longitudinal cross-sectional view of the detail Y of FIG. 1.

Toward a first attaching end 4 of the first shaft element 3 that is opposite to the first free end 5, each of the first grooves 7 ends in a groove run-out 8, in which the base of the first grooves 7 approaches the outer face 6. Toward the free end 5 of the first shaft element 3, there is illustrated a first stop 9 in the form of a ring. The first stop 9 is positioned on a step face and is held on the step face by a securing ring that engages a recess of the first shaft element 3. The diameter of the ring forming the first stop 9 is such that the outer diameter thereon extends into the region of the first grooves 7.

Toward the groove run-out 8, a circumferential recess is provided in the outer face 6 of the first shaft element 3, which outer face 6 is interrupted by the first grooves 7. In this circumferential recess, there is provided a second stop 10 in the form of a securing ring or the like. Like the ring forming the first stop 9, the ring forming the second stop 10 projects into region of the first grooves 7. Between the first stop 9 and the second stop 10, there is defined a free axial distance A (see FIG. 5).

The first shaft element 3 is received in a through-bore 15 of the second shaft element 11, which includes a second attaching end 12 that is adapted to be connected to another component such as, for example, a second universal joint (not shown). Removed from the second attaching end 12, there is provided a second free end 13. In the illustrated shortened condition of the longitudinal displacement unit 1 (i.e., in the position in which the two shaft elements 3 and 11 are inserted into each other to the greatest possible extent), the second free end 13 of the second shaft element 11 approaches the first attaching end 4 of the first shaft element 3, and the first free end 5 of the first shaft element 3 approaches the second attaching end 12 of the second shaft element 11.

The through-bore 15 has an inner face 14 into which a second plurality of grooves 16 is provided. The second grooves 16 extend parallel to the longitudinal axis 2 in such a way that they are respectively positioned opposite corresponding ones of the first grooves 7. Thus, one first groove 7 and one second groove 16 form an associated pair of grooves.

The second shaft element 11 is associated with a third stop 17 that also constitutes a kind of securing ring and is located in a circumferential recess that extends into the region of the second grooves 16. The third stop 17 is located toward the second free end 13 of the second shaft element 11 at the ends of the second grooves 16. Toward the second attaching end 12 of the second shaft member 11, at the other ends of the second grooves 16, there is provided a circumferential recess that cuts into the second grooves 16 and forms a fourth stop 18, which includes another securing ring.

In the radial space between the inner face 14 of the second shaft element 11 and the outer face 6 of the first shaft element 3, a cage 19 is provided. The structure of the cage 19 is illustrated in detail in FIG. 6. Toward the first free end 5 of the first shaft element 3 and the second attaching end 12 of the second shaft element 11, the cage 19 includes a first cage end 19a. At the opposite end, a second cage end 19b faces toward the first attaching end 4 of the first shaft element 3 and the second free end 13 of the second shaft element 11. The cage 19 is generally sleeve-shaped and, in accordance with the pairs of first grooves 7 in the first shaft element 3 and the associated second grooves 16 in the second shaft element 11, includes circumferentially distributed rows 22 of windows 20. The windows 20 are arranged at a distance from one another along the longitudinal axis 2 and serve to each receive a rolling contact member 21, each in the form of a ball in the illustrated embodiment. The balls 21, by means of portions thereof that project radially inwardly beyond an inner cage face 19*d*, extend into the first grooves 7 provided in the first shaft element 3. Similarly, the balls 21, by means of portions thereof that project radially outwardly beyond an outer cage face 19*c*, extend into the second grooves 16 provided in the second shaft element 11. The balls 21 are guided by the cage 19 and serve to transmit torque between the first shaft element 3 and the second shaft element 11.

Figure 6:
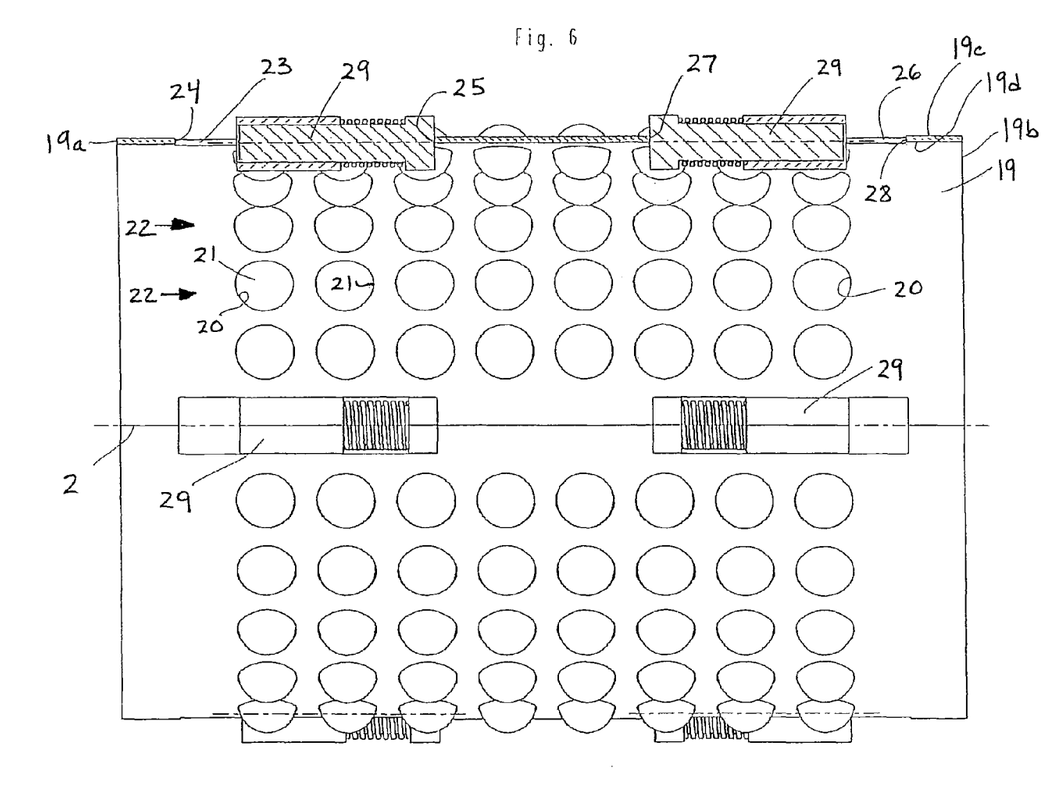
FIG. 6 is a further enlarged longitudinal elevational view, partially in cross-section, of the cage with the associated guiding elements and pressure springs shown in FIGS. 1 to 5.

In addition, the cage 19 is provided with a first through-aperture 23 and a second through-aperture 26. In the illustrated embodiment, the through-apertures 23 and 26 are each generally oblong in shape, are each circumferentially distributed, are arranged one behind the other along and parallel to the longitudinal axis 2, and are longitudinally spaced apart from one another. The first through-aperture 23 ends toward the first cage end 19*a* with a first longitudinal end 24 and, remote therefrom, with a second longitudinal end 25. Similarly, the second through-aperture 26 ends toward the second cage end 19*b* with a fourth longitudinal end 28 and, remote therefrom (i.e., close to the first through-aperture 23), with a third longitudinal end 27. In the illustrated embodiment, there are arranged four such pairs of first through-apertures 23 and second through-apertures 26. However, it is also possible for there to be provided either fewer or more pairs of such through-apertures 23 and 26, or rollers instead of the balls 21 forming the rolling contact members. In addition, it is also possible, instead of two through-apertures 23 and 26, to provide only one continuous through-aperture.

Each of the through-apertures 23 and 26 serves to receive a unit that includes a pressure spring 38. In the illustrated embodiment, the pressure springs 38 are helical pressure springs, although such is not required. The pressure springs 38 are provided in the through-apertures 23 and 26 and may be supported on respective guiding elements 29 in order to improve the supporting conditions at the longitudinal ends because of the load applied by the stops 9, 10, 17, and 18. In the first embodiment of this invention illustrated in FIGS. 1 to 6, each of the guiding elements 29 includes a guiding pin 30 that is provided with a head 31. Each of the heads 31 includes a head face 32 that faces away from the guiding pins 30. Each of the heads 31 also includes an annular face 33 that faces toward the guiding pins 30. Each of the illustrated guiding elements 29 further includes a guiding sleeve 34 having a bore 35 that is guided on the associated guiding pin 30. Facing toward the heads 31 of the guiding elements 29, each of the guiding sleeves 34 includes a first end face 36. Facing away from the heads 31 of the guiding elements 29, each of the guiding sleeves 34 includes a second end face 37. The pressure springs 38 are respectively supported on each of the guiding pins 30, with one end of each pressure spring 38 engaging the annular face 33 of the head 31 of the guiding element 29 and the other end of the pressure spring 38 engaging the first end face 36 of the associated guiding sleeve 34. The guiding elements 29 and the pressure springs 38 are dimensioned in such a way that each guiding element 29, by means of the pressure spring 38, is received in one of the through-apertures 23 and 26. With reference to the first through-aperture 23, the head face 32 of the guiding element 29 is positioned to engage the second longitudinal end 25 of the first through-aperture 23, while the second end face 37 of the guiding sleeve 34 is positioned to engage the first longitudinal end 24 of the first through-aperture 23. Similarly, with reference to the second through-aperture 26, the head face 32 of the guiding element 29 is positioned to engage the third longitudinal end 27 of the second through-aperture 26, while the second end face 37 of the guiding sleeve 34 is positioned to engage the fourth longitudinal end 28 of the second through-aperture 26. This design measure may be the same for all of the other through-apertures 23 and 26 distributed around the circumference of the cage 19 in the illustrated embodiment.

In the furthest inserted position shown in FIG. 1, (in other words, in the shortest position of the first shaft element 3 relative to the second shaft element 11), the second end face 37 of the guiding sleeve 34, with reference to the guiding element 29 associated with the second through-aperture 26, is in contact with the second stop 10 associated with the first shaft element 3. It can be seen in FIGS. 1 and 3 that the pressure spring 38, starting from the loaded position between the longitudinal ends, is loaded further and that the second end face 37 is no longer in contact with the third longitudinal end 27 of the second through-aperture 26. Similarly, because the fourth stop 18 is in contact with the second end face 37 of the guiding sleeve 34 of the guiding element 29 arranged in the first through-aperture 23, the second end face 37 is not in contact with the first longitudinal end 24 of the first through-aperture 23. In both guiding elements 29, the heads 31 are respectively supported on the second longitudinal end 25 of the first through-aperture 23 and on the first longitudinal end 27 of the second through-aperture 26.

When the two shaft elements 3 and 11 are pulled apart, the guiding elements 29 first again assume a position in which also the second end faces 37 of the guiding sleeves 34 are again supported on the corresponding longitudinal ends 24 and 27 of the two through-apertures 23 and 26, respectively. Starting from the resulting position of the cage 19 along the longitudinal axis 2 relative to the shaft elements 3 and 11, a free adjustment of the cage 19 along the longitudinal axis relative to the two shaft elements 3 and 11 can be effected via the rolling contact members 21 in the first grooves 7 and in the second grooves 16 until there has been reached the furthest extracted position, in which the second end face 37 of the guiding element 29 associated with the first through-aperture 23 comes to rest against the first stop 9 arranged at the first free end 5 of the first shaft element 3, and in which the third stop 17 of the second shaft element 11 comes to rest against the second end face 37 of the guiding element 29 associated with the second through-aperture 26.

Figure 5:
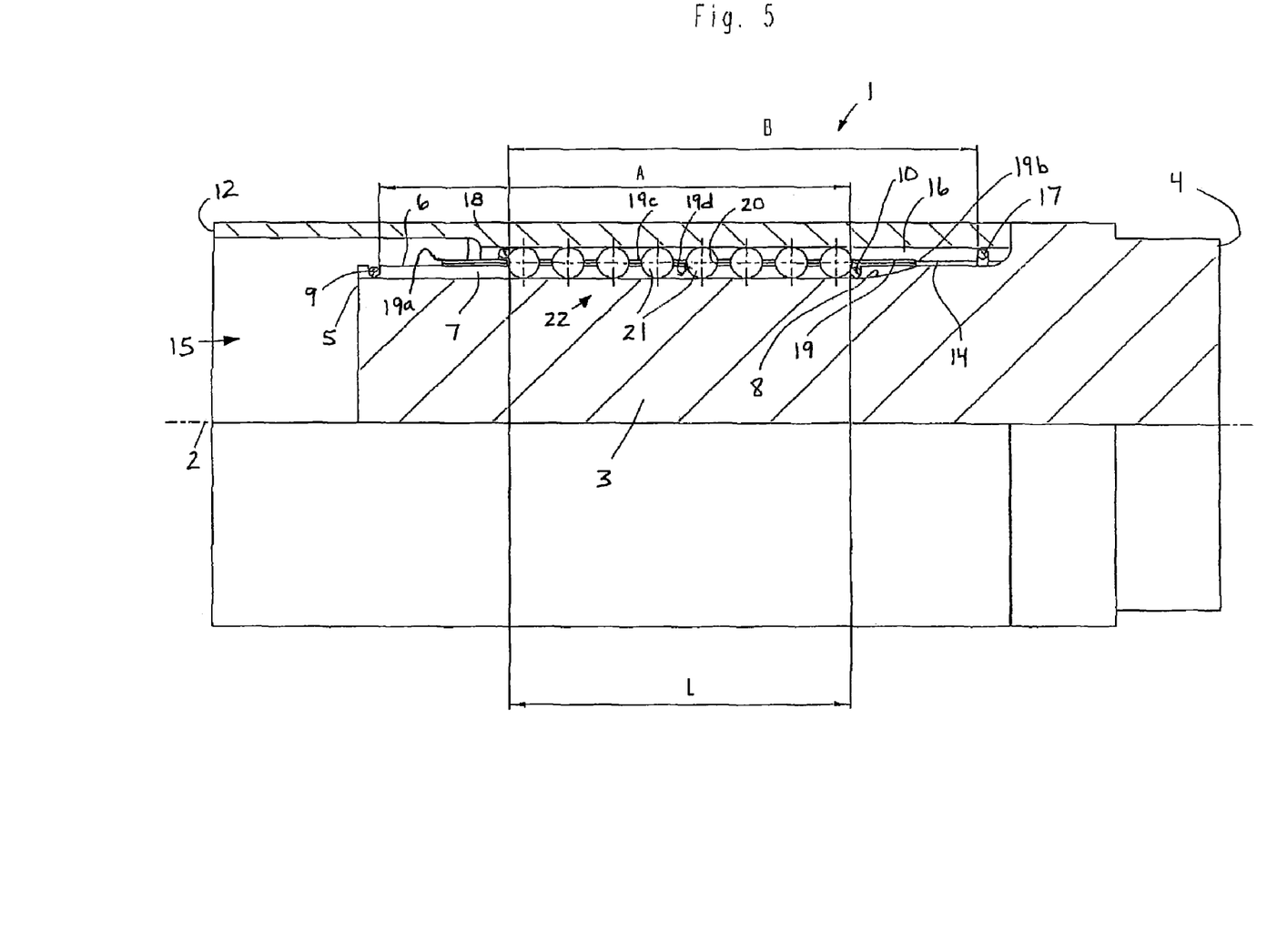
FIG. 5 is an enlarged cross-sectional view of the first embodiment of the longitudinal displacement unit taken along line V-V of FIG. 2.

After contact between the first shaft element 3 and the second shaft element 11 and extraction of the first shaft element 3 from the second shaft element 11 have been achieved, the pressure springs 38 are compressed, In the process of abutment, the movements carried out by the two shaft elements 3 and 11 relative to one another are dampened when this position has been reached. The third stop 17 and the fourth stop 18 are arranged at a distance B (see FIG. 5) from one another, which distance B is also greater than the length L between the two outer balls 21 of a row 22 of such balls 21. This also explains the free paths along which an adjustment of the first shaft element 3 relative to the second shaft element 11 can take place without the guiding elements becoming active, thus allowing the cage 19 to be adjusted between the two shaft elements 3 and 11 under the effect of a rolling friction. Only when such paths have been used up do the guiding elements 29 cooperate with the stops, with the pressure spring 38 coming into effect and with the movement of the cage 19 being dampened. In addition, as can be seen in FIG. 5, it is possible to limit the spring travel as well, in that the stops cooperate directly with the rolling contact members 21 near the cage ends 19*a* and 19*b*. However, it is also possible (if only one of the directions of movement is of significance) to associate only one or two stops with the two shaft elements 3 and 11 or one of the shaft elements 3 and 11.

Figure 7:
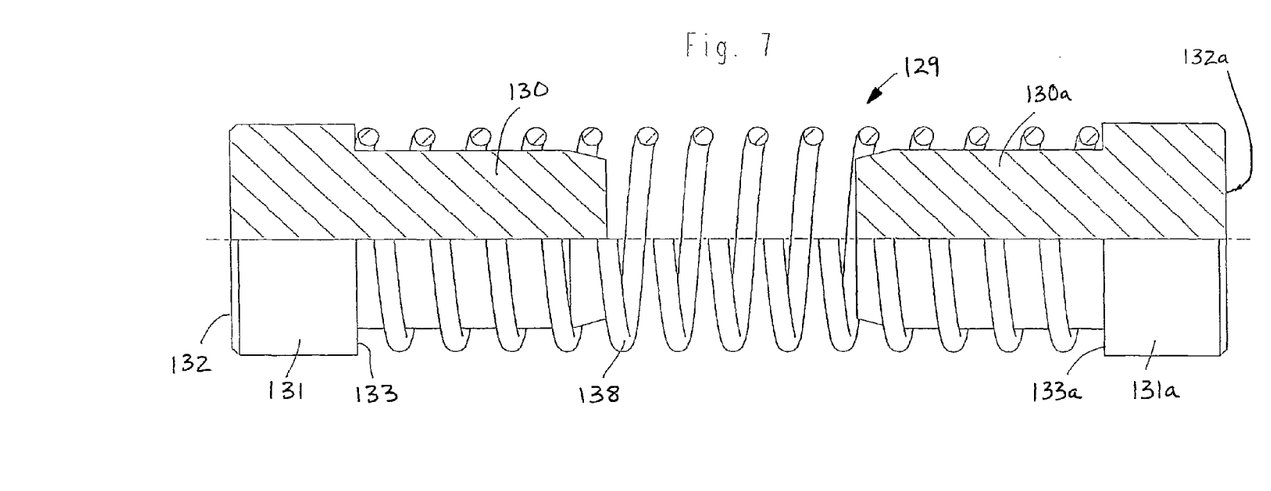
FIG. 7 is a longitudinal elevational view, partially in cross-section, of a second embodiment of a guiding element for the longitudinal displacement unit shown in FIGS. 1 to 6.

As the guiding elements 29 are advantageously positioned between the first shaft element 3 and the second shaft element 11, it is also possible to provide a simplified embodiment of the guiding elements 29. Such a modified embodiment is shown in FIG. 7, according to which a modified guiding element 129 is reduced to two guiding pins 130 and 130a that possess respective heads 131 and 131a that each define a head face 132 and 132a for being supported on the longitudinal ends of the through-apertures 23 and 26 and, for the purpose of supporting the pressure spring 138, define respective annular faces 133 and 133a that face a pressure spring 138. The guiding pins 130 and 130a each engage the bore formed by the pressure spring 138 that, in the illustrated embodiment, is provided in the form of a helical spring.

Figure 8:
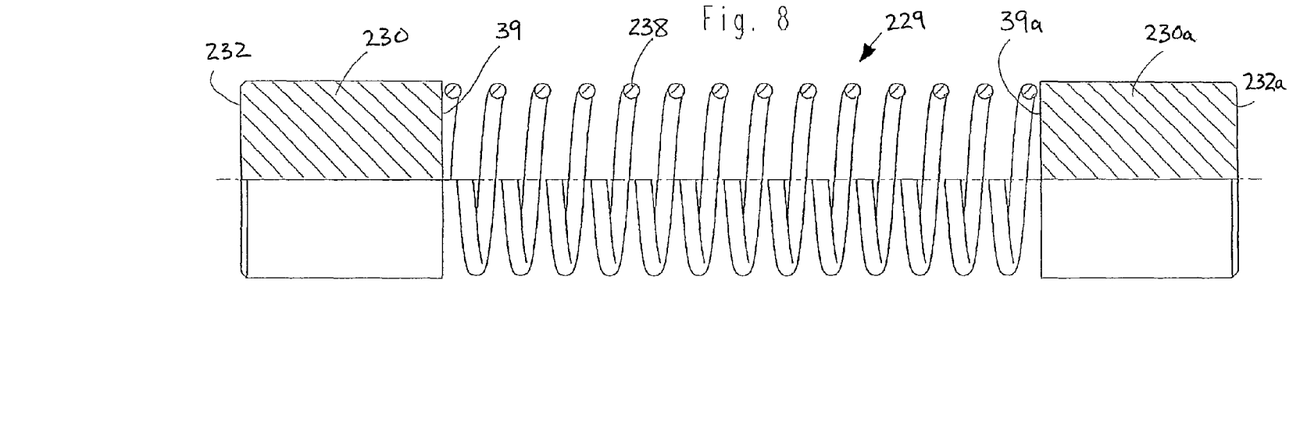
FIG. 8 is a longitudinal elevational view, partially in cross-section, of a third embodiment of a guiding element for the longitudinal displacement unit shown in FIGS. 1 to 6.

A further modified embodiment is shown in FIG. 8, which provides guiding elements 229 in the form of guiding pins 230 and 230a that replace the heads 131 and 131a in the FIG. 7. The heads 230 and 23a have respective annular faces 39, 39a that are supported on the ends of a pressure spring 238 and respective head faces 232 and 232a for being supported on the longitudinal ends of the two through-apertures 23 and 36.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A longitudinal displacement unit for a driveshaft comprising:
   a first shaft element defining a longitudinal axis, the first shaft element including an outer face having a plurality of first grooves provided therein that extend parallel to the longitudinal axis and are circumferentially distributed in the outer face;
   a second shaft element having a through-bore that extends along the longitudinal axis and that receives the first shaft element, the second shaft element having a plurality of second grooves provided in the through-bore opposite the first plurality of grooves and that extend parallel to the longitudinal axis and are circumferentially distributed;
   a sleeve-shaped cage that is disposed between the first shaft element and the second shaft element and that guides rolling contact members that engage the first plurality of grooves and the second plurality of grooves, wherein the cage is provided with through-apertures that are circumferentially distributed and extend parallel to the longitudinal axis and that include longitudinal ends; and
   a pressure spring disposed within each of the through-apertures, wherein the first shaft element and the second shaft element are longitudinally movable relative to one another through a first range, wherein the first shaft element and the second shaft element are not loaded by the pressure springs, and through a second range, wherein the first shaft element and the second shaft element are loaded by the pressure springs.

2. A longitudinal displacement unit according to claim 1, characterized in that one of the shaft elements is associated with two stops arranged along the longitudinal axis at a distance from one another, the stops causing the pressure springs to load the first shaft element and the second shaft element when moved through the second range.

3. A longitudinal displacement unit according to claim 2, characterized in that each the stop is dimensioned in such a way that it is abutted by the rolling contact members close to ends of the cage.

4. A longitudinal displacement unit according to claim 3, characterized in that the distance between the stops associated with the shaft element is greater than a length of a row of rolling contact members which are associated with a pair of a first groove and a second groove along the longitudinal axis.

5. A longitudinal displacement unit according to claim 1, characterized in that both shaft elements are each associated with a stop, the stops causing the pressure springs to load the first shaft element and the second shaft element when moved through the second range.

6. A longitudinal displacement unit according to claim 1, characterized in that each of the shaft elements is associated with two stops arranged along the longitudinal axis at a distance from one another, the stops causing the pressure springs to load the first shaft element and the second shaft element when moved through the second range.

7. A longitudinal displacement unit according to claim 1, characterized in that there are provided two sets of pressure springs, wherein the pressure springs of the two sets cooperate with different stops to load the first shaft element and the second shaft element when moved through the second range.

8. A longitudinal displacement unit according to claim 7, characterized in that the pressure springs are received in through-apertures arranged one behind the other along the longitudinal axis.

9. A longitudinal displacement unit according to claim 1, characterized in that at least one stop is arranged in such a way that rolling contact members of the cage come to rest against same after a predetermined spring travel of the pressure spring has been covered.

10. A longitudinal displacement unit according to claim 1, characterized in that each pressure spring is held by a guiding element that is arranged in one of the through-apertures.

11. A longitudinal displacement unit according to claim 10, characterized in that the guiding element includes a guiding pin having a head provided with a head face and an annular face at its guiding pin end, as well as a guiding sleeve that is adjustable on the guiding pin and includes a first end face at its guiding pin end and a second end face at its end opposed thereto, wherein the pressure spring is arranged on the guiding pin between the annular face and the first end face.

12. A longitudinal displacement unit according to claim 11, characterized in that the head face and the second end face serve to support the guiding elements comprising the pressure spring on the longitudinal ends of the associated through-aperture.

13. A longitudinal displacement unit according to claim 10, characterized in that the guiding element comprises two guiding pins each having a head provided with a head face and an annular face at its guiding pin end, wherein the two guiding pins are positioned in one of the two ends of a pressure spring and wherein the head faces rest against the longitudinal ends of the through-apertures in an unloaded condition.

14. A longitudinal displacement unit according to claim 10, characterized in that the guiding element comprises two guiding pins each having a head face and a supporting face at the longitudinal ends, wherein the associated pressure spring is received between the guiding pins.

15. A longitudinal displacement unit according to claim 10, characterized in that at least one stop is arranged in such a way that it is abutted by at least one of the guiding elements.

16. A longitudinal displacement unit according to claim 1, further comprising at least one stop associated with one of the shaft elements, wherein in the second range, the pressure springs are pressure-loaded between the at least one stop and one of the longitudinal ends of the through aperture.

17. A longitudinal displacement unit for a driveshaft comprising:
- a first shaft element defining a longitudinal axis, the first shaft element including an outer face having a plurality of first grooves provided therein that extend parallel to the longitudinal axis and are circumferentially distributed in the outer face;
- a second shaft element having a through-bore that extends along the longitudinal axis and that receives the first shaft element, the second shaft element having a plurality of second grooves provided in the through-bore opposite the first plurality of grooves and that extend parallel to the longitudinal axis and are circumferentially distributed;
- a sleeve-shaped cage that is disposed between the first shaft element and the second shaft element and that guides rolling contact members that engage the first plurality of grooves and the second plurality of grooves, wherein the cage is provided with through-apertures that are circumferentially distributed and extend parallel to the longitudinal axis and that include longitudinal ends;
- pressure springs that are disposed within the through-apertures and that are loaded between the longitudinal ends thereof; and
- at least one stop that is associated with one of the shaft elements and that causes the pressure springs to load the two shaft elements after having passed through a range of movement of the cage between the two shaft elements which is not loaded by the pressure springs; wherein each pressure spring is held by a guiding element that is arranged in one of the through-apertures.

18. A longitudinal displacement unit according to claim 17, characterized in that the guiding element includes a guiding pin having a head provided with a head face and an annular face at its guiding pin end, as well as a guiding sleeve that is adjustable on the guiding pin and includes a first end face at its guiding pin end and a second end face at its end opposed thereto, wherein the pressure spring is arranged on the guiding pin between the annular face and the first end face.

19. A longitudinal displacement unit according to claim 18, characterized in that the head face and the second end face serve to support the guiding elements comprising the pressure spring on the longitudinal ends of the associated through-aperture.

20. A longitudinal displacement unit according to claim 17, characterized in that the guiding element comprises two guiding pins each having a head provided with a head face and an annular face at its guiding pin end, wherein the two guiding pins are positioned in one of the two ends of a pressure spring and wherein the head faces rest against the longitudinal ends of the through-apertures in an unloaded condition.

* * * * *